(12) United States Patent
Noguchi et al.

(10) Patent No.: US 10,266,082 B2
(45) Date of Patent: Apr. 23, 2019

(54) AIR-PERMEABLE SEAT AND AIR CONDITIONING SYSTEM OF SEAT

(71) Applicant: TACHI-S CO., LTD., Akishima-shi, Tokyo (JP)

(72) Inventors: Kazuo Noguchi, Ome (JP); Jun Takano, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 16 days.

(21) Appl. No.: 15/502,067

(22) PCT Filed: Mar. 16, 2015

(86) PCT No.: PCT/JP2015/057669
§ 371 (c)(1),
(2) Date: Feb. 6, 2017

(87) PCT Pub. No.: WO2016/021225
PCT Pub. Date: Feb. 11, 2016

(65) Prior Publication Data
US 2017/0225598 A1    Aug. 10, 2017

(30) Foreign Application Priority Data

Aug. 6, 2014 (JP) ................................. 2014-159972

(51) Int. Cl.
*B60N 2/56* (2006.01)
*A47C 7/74* (2006.01)

(52) U.S. Cl.
CPC .............. *B60N 2/5642* (2013.01); *A47C 7/74* (2013.01); *A47C 7/744* (2013.01); *B60N 2/56* (2013.01); *B60N 2/565* (2013.01)

(58) Field of Classification Search
CPC ...... B60N 2/56; B60N 2/5621; B60N 2/5642; B60N 2/565; B60N 2/5657; B60N 2/5628;
(Continued)

(56) References Cited

U.S. PATENT DOCUMENTS 6,003,950 A * 12/1999 Larsson .................... A47C 7/74
297/180.13
6,976,734 B2 * 12/2005 Stoewe ................ B60N 2/5635
297/180.1
(Continued)

FOREIGN PATENT DOCUMENTS

DE          19845697 C1 *  3/2000  .......... B60N 2/5635
JP         2000504236 A     4/2000
(Continued)

OTHER PUBLICATIONS

Extended European Search Report dated Mar. 7, 2018 issued in counterpart European Application No. 15830541.7.
(Continued)

*Primary Examiner* — Ryan D Kwiecinski
(74) *Attorney, Agent, or Firm* — Holtz, Holtz & Volek PC

(57) ABSTRACT

An air-permeable seat having a seat cushion and a seatback, each formed by mounting an urethane pad on a frame and then covering the urethane pad with an air-permeable trim cover, the air-permeable seat includes a fiber pad provided in at least one of the seat cushion and the seatback and penetrating a part of the urethane pad; a chamber defined at the back of the fiber pad, covering the fiber pad and shaped to rectify an airflow coming from the fiber pad; and air intake parts flow the air in the fiber pad and introduce the air from the fiber pad into the chamber; wherein as the air intake parts is driven, air is drawn from the surface of the fiber pad through the trim cover, flows from the fiber pad to the chamber, may be rectified in the chamber and flow out through the chamber.

13 Claims, 5 Drawing Sheets

(58) Field of Classification Search
CPC ........... A47C 7/74; A47C 7/742; A47C 7/744; A47C 27/12; A47C 27/14
USPC .......................................... 297/180.1, 180.14
See application file for complete search history.

(56) References Cited

U.S. PATENT DOCUMENTS

| | | | | |
|---|---|---|---|---|
| 9,901,181 | B2* | 2/2018 | Miyata | A47C 27/22 |
| 2002/0096915 | A1* | 7/2002 | Haupt | B60H 1/00285 |
| | | | | 297/180.13 |
| 2003/0214160 | A1* | 11/2003 | Brennan | A47C 7/74 |
| | | | | 297/180.14 |
| 2005/0082885 | A1* | 4/2005 | Thunissen | B60N 2/56 |
| | | | | 297/180.1 |
| 2009/0001787 | A1* | 1/2009 | Lawall | B60N 2/5628 |
| | | | | 297/217.1 |
| 2009/0096256 | A1* | 4/2009 | Kikuchi | B60R 11/0264 |
| | | | | 297/180.1 |
| 2010/0038937 | A1* | 2/2010 | Andersson | B60N 2/5635 |
| | | | | 297/180.14 |
| 2015/0158405 | A1* | 6/2015 | Miyata | A47C 27/14 |
| | | | | 297/180.1 |
| 2016/0114709 | A1* | 4/2016 | Kim | B60N 2/5628 |
| | | | | 454/120 |
| 2017/0240078 | A1* | 8/2017 | Ishii | B60N 2/5642 |

FOREIGN PATENT DOCUMENTS

| | | | | | |
|---|---|---|---|---|---|
| JP | 2003235677 | A | * | 8/2003 | ........... B60N 2/5657 |
| JP | 2003237444 | A | | 8/2003 | |
| JP | 2004073429 | A | | 3/2004 | |
| JP | 2012115515 | A | | 6/2012 | |
| JP | 2012228333 | A | | 11/2012 | |
| JP | 5505404 | B2 | * | 5/2014 | ........... B60N 2/5621 |
| JP | 2015107744 | A | * | 6/2015 | ............ A47C 27/14 |
| JP | 6054152 | B2 | * | 12/2016 | ........... B60N 2/5642 |
| WO | 2014058429 | A1 | | 4/2014 | |
| WO | WO-2015141197 | A1 | * | 9/2015 | ........... B60N 2/5642 |
| WO | WO-2015178135 | A1 | * | 11/2015 | ............ A47C 27/14 |

OTHER PUBLICATIONS

International Search Report corresponding to Application No. PCT/JP2015/057669; dated Jun. 2, 2015, with English translation.

* cited by examiner

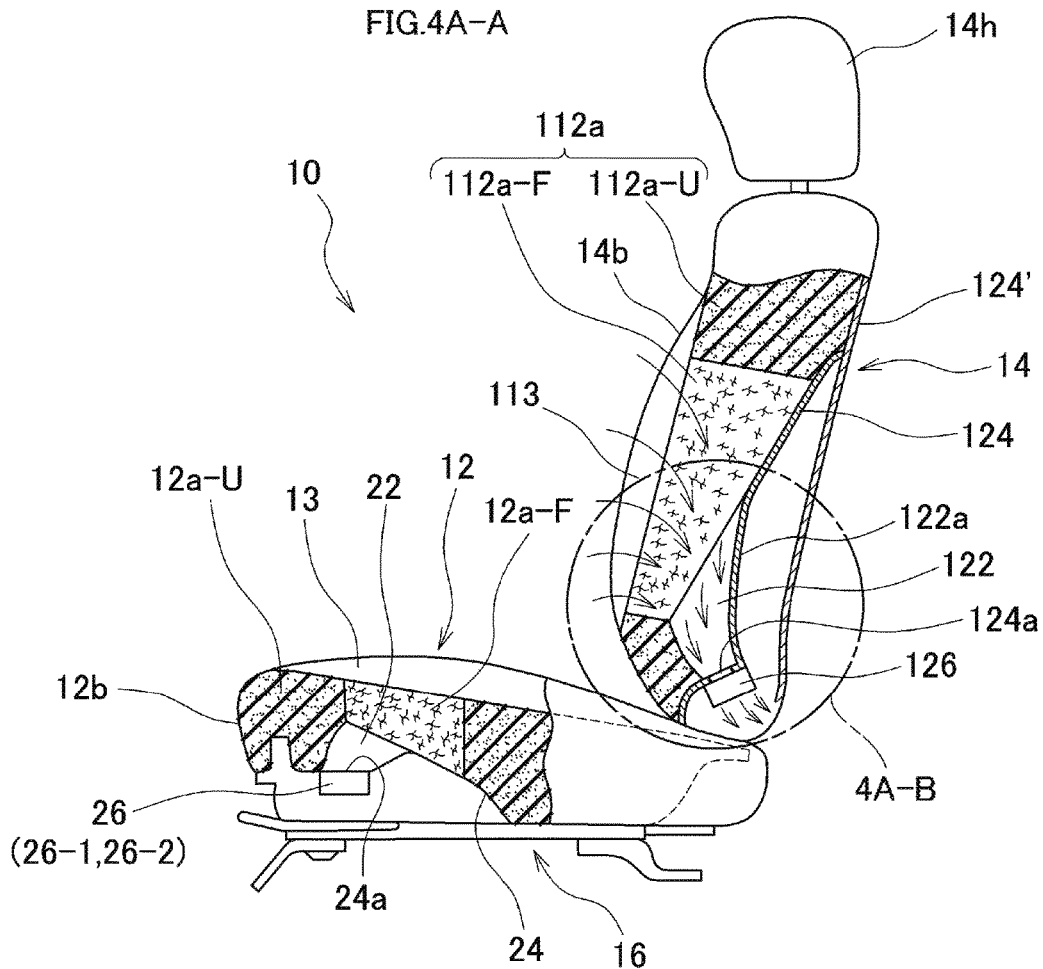
FIG.4A-A
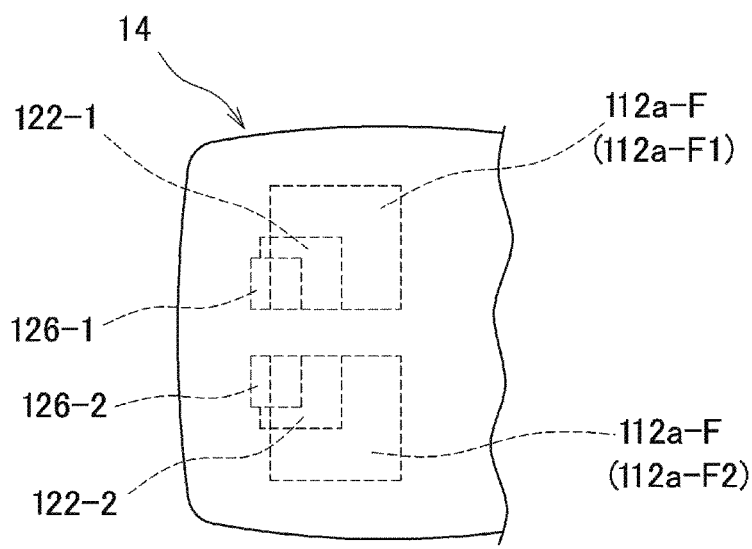
FIG.4A-B

AIR-PERMEABLE SEAT AND AIR CONDITIONING SYSTEM OF SEAT

CROSS REFERENCE TO RELATED APPLICATIONS

This is the U.S. national stage of application No. PCT/JP2015/057669 dated Mar. 16, 2015. Priority under 35U.S.C. § 119(a) and 35 U.S.C. § 365(b) is claimed from Japanese Patent Application No. 2014-159972, filed Aug. 6, 2014, the entire contents of which are incorporated herein by reference.

DESCRIPTION

1. Field of the Invention

This invention relates to an air-permeable (ventilating) seat in which air flows into the seat pad to remove heat or moisture from the seat pad, and also to an air conditioning system for the seat.

2. Description of the Related Art

A seat comprises a seat cushion and a seatback. Usually, the seat cushion and the seatback are each composed of a frame (i.e., skeleton), a seat pad made of foamed material such as urethane and mounted on the frame, and an trim cover having air permeability and covering the seat pad. An air-permeable seat having an air conditioning system is known. The air conditioning system forces air into the air passages made in the seat pad of the seat cushion and in the seat pad of the seatback, thereby to remove heat or moisture emanating from the occupant of the seat.

Particularly in a seat on which a person keeps seated for a long time, such as the vehicle seat, the heat or moisture resulting from the occupant's temperature and sweat accumulates in the space between the occupant's buttocks and the seat cushion and the space between the occupant's back and the seatback. The heat or moisture inevitably makes the occupant fell uncomfortable.

JP 2003-237444A, for example, discloses a seat that comprises a urethane pad having a recess in the upper surface and an auxiliary pad (i.e. fiber pad) made of filament nets and arranged in the recess. The urethane pad is mounted on a bottom panel, the fiber pad is set in the recess made in the upper surface of the urethane pad, and an air blower (i.e., air blowing means) is arranged below the urethane pad. Further, air passages are provided in the urethane pad, and communicate the fiber pad and the air blower with each other.

The air blower comprises a blower fan that has a Peltier element and can exchange heat. In the air blower, the air blower undergoes heat exchanging, and heated or cooled, or neither heated nor cooled. The air is then supplied from the air blower to the air passages, and flows from the lower surface of the fiber pad into the fiber pad, passes through the fiber pad, and flows from the upper surface of the fiber pad.

Japanese Patent unexamined Publication JP 2004-073429A discloses a seat, in which a hot-air generating apparatus (i.e., blowing means) is arranged below the air holes that communicate with a net-like cushion body (i.e., fiber pad). Air is drawn into the hot-air generating apparatus and is then heated by a heater. The air so heated flows into a net-like cushion body (i.e., fiber pad) through the air holes.

Further, Japanese Patent unexamined Publication JP 2012-115515A discloses a seat, in which air holes are made in a part of a urethane pad, penetrating a part of the urethane pad in the up-down direction, and a fiber pad is arranged in the whole of the air holes or in the upper half of the air holes.

Patent Literature 1: Japanese Patent unexamined Publication JP 2003-237444A

Patent Literature 2: Japanese Patent unexamined Publication JP 2004-073429A

Patent Literature 3: Japanese Patent unexamined Publication JP 2012-115515A

In the air conditioning systems described in Japanese Patent unexamined Publications JP 2003-237444A and JP 2004-073429A, air is heated or cooled, or neither heated nor cooled, is supplied from the blowing means to the air passages made in the urethane pad, passes through the air passages, and flows into the fiber pad from the lower surface thereof.

The fiber pad excels in air permeability. Air therefore can flow, diffused in the fiber pad. However, the air passage has a small cross-sectional area, and the air flows from the air passage into the fiber pad as if it were injected. As a result, the air flows into the fiber pad, without being diffused, and then flows in a narrow region, only right above the air passage and in the areas adjacent thereto, and flows out from the upper surface of the fiber pad. Thus, the air scarcely flows in that part of the fiber pad, which lies above the air passages. Inevitably, the air can hardly flow in those parts of the fiber pad, which are remote from the air passages. Consequently, the heat or moisture accumulated in the space between the occupant's buttocks and the seat cushion or in the space between the occupant's back and the seatback is removed from narrow regions only, such as the region immediately above the air passages and the region adjacent to the air passage. Consequently, the heat or moisture cannot be adequately removed.

In the seat disclosed in JP 2012-115515A, no blowing means is provided, and air undergoes natural flow in the fiber pad. Inevitably, the seat has low air permeability, and the heat or moisture accumulated between the occupant's buttocks and the seat cushion or between the occupant's back and the seatback is not removed.

The air conditioning systems described in JP 2003-237444A and JP 2004-073429A supply air into the fiber pad. They do not draw air into the fiber pad through the trim cover.

The heat resulting from the occupant's temperature or the moisture resulting from the occupant's sweat accumulates not only in the space between the occupant's buttocks and the seat cushion, but also in the space between the occupant's back and the seatback. Moreover, the heat or the moisture accumulates in the fiber pad, too. The heat or the moisture accumulated in the fiber pad is removed, but only from narrow regions immediately above and adjacent to the air passage.

An object of this invention is to provide an air-permeable seat in which air flows into the seat pad to adequately remove heat or moisture accumulated between the occupant's buttocks and the seat cushion or between the occupant's back and the seatback.

Another object of this invention is to provide an air conditioning system for seat, which can adequately remove heat or moisture accumulated between the occupant's buttocks and the seat cushion or between the occupant's back and the seatback.

SUMMARY OF THE INVENTION

In this invention, air is drawn into a fiber pad through a trim cover and then flows in the fiber pad in the form of a rectified airflow.

According to one aspect of the embodiment, an air-permeable seat having a seat cushion and a seatback, each formed by mounting a urethane pad on a frame used as skeleton and then covering the urethane pad with an air-permeable trim cover, is provided. The air-permeable seat includes a fiber pad provided in at least one of the seat cushion and the seatback and penetrating a part of the urethane pad from an upper surface to a lower surface of the urethane pad; a chamber shaped to rectify an airflow coming from the fiber pad; and a fan configured to draw air from a surface of the fiber pad through the trim cover, flow the air in the fiber pad, and introduce the air from the fiber pad into the chamber. The chamber is defined at the back of the fiber pad and opposes the fiber pad, and a cross section of the chamber has a shape that gradually narrows from an air inlet side to an air outlet side. The fan faces the chamber, opposes the fiber pad, and makes the air rectified in the chamber flow out through the chamber, whereby the rectified air flows in the fiber pad.

In the invention, the air is supplied from the fiber pad into the chamber and is rectified in the chamber, generating a rectified airflow. The airflow flows into the fiber pad, thoroughly flowing in the fiber pad. The air is therefore drawn not only from the region above the fiber pad, but also from the region surrounding the fiber pad. Thereafter, the air flows into the fiber pad, together with the heat or moisture accumulated between the occupant's buttocks and the seat cushion or between the occupant's back and the seatback. Hence, the heat or moisture is adequately removed from the occupant's buttocks or back.

BRIEF DESCRIPTION OF THE DRAWINGS

FIG. 4A-A is a partly sectional side view of a seat cushion and seatback, schematically showing an embodiment of this invention; and FIG. 4A-B is a plan view of the part 4A-B of the seatback shown in FIG. 4A-A.

DETAILED DESCRIPTION OF THE INVENTION

An air-permeable seat having a seat cushion and a seatback, each formed by mounting an urethane pad on a frame used as skeleton and then covering the urethane pad with an air-permeable trim cover, the air-permeable seat includes a fiber pad provided in at least one of the seat cushion and the seatback and penetrating a part of the urethane pad from the upper surface to lower surface of the urethane pad; a chamber defined at the back of the fiber pad, covering the fiber pad, and shaped to rectify an airflow coming from the fiber pad; and air intake means facing the chamber, opposing the fiber pad, and configured to draw air from the surface of the fiber pad through the trim cover, flow the air in the fiber pad and introduce the air from the fiber pad into the chamber; wherein as the air intake means is driven, air is drawn from the surface of the fiber pad into the fiber pad through the trim cover, flows from the fiber pad to the chamber, is rectified in the chamber and flows out through the chamber, whereby the rectified air flows in the fiber pad.

Embodiment

Figure 1A:
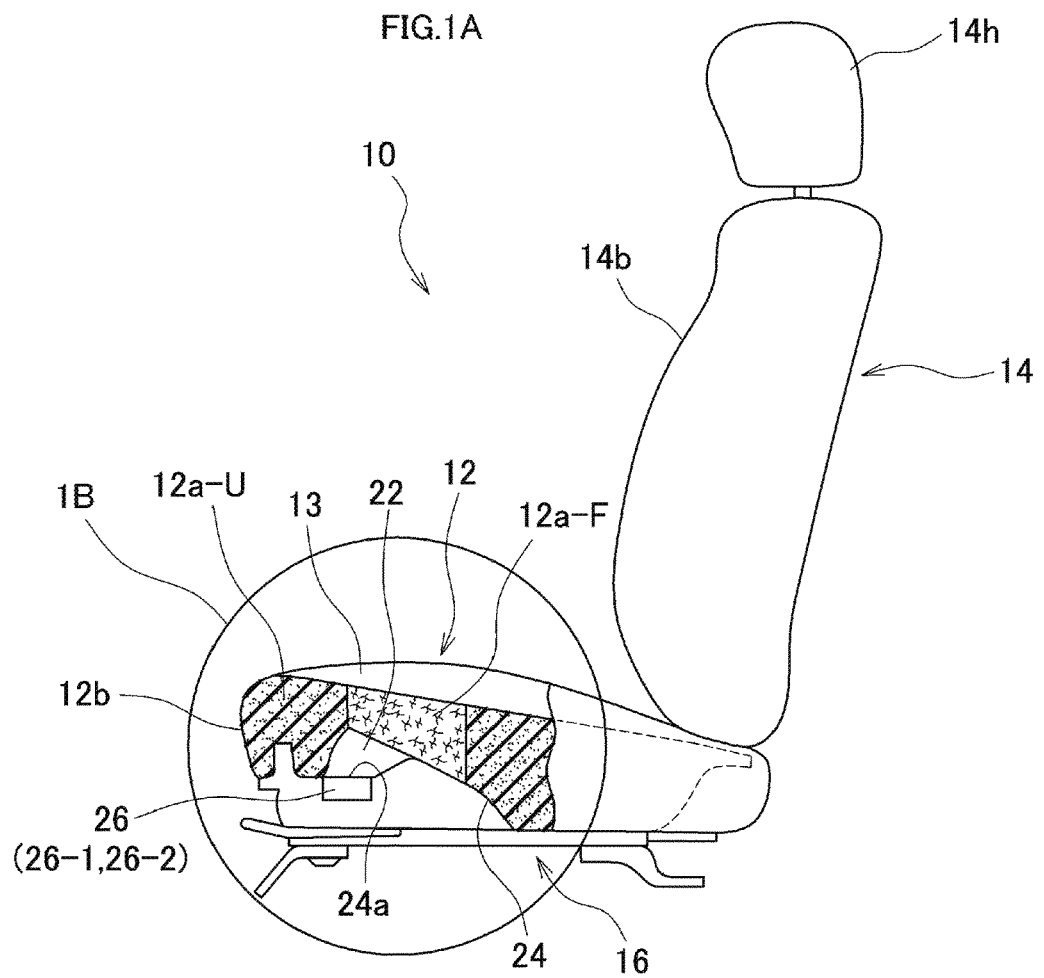
FIG. 1A is a partly sectional side view of a seat, schematically showing an embodiment of this invention.
Figure 1B:
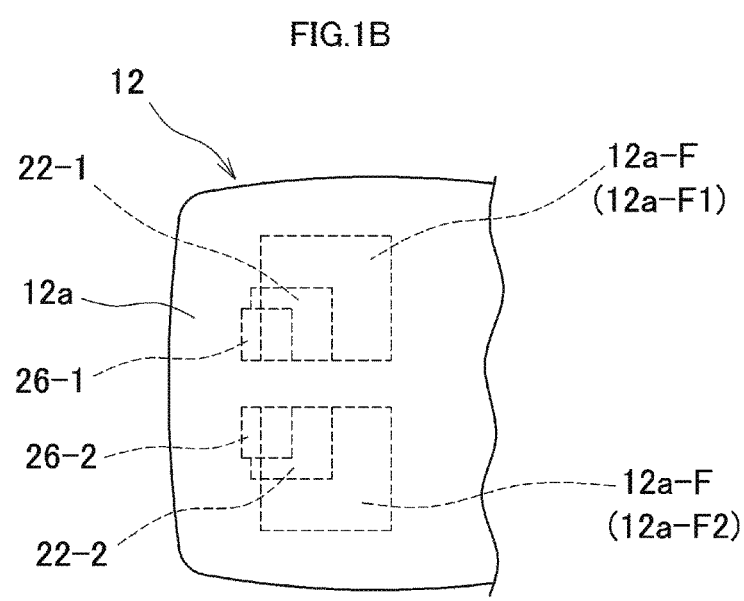
FIG. 1B is a plan view of the part 1B of the seat shown in FIG. 1A.
Figure 2A:
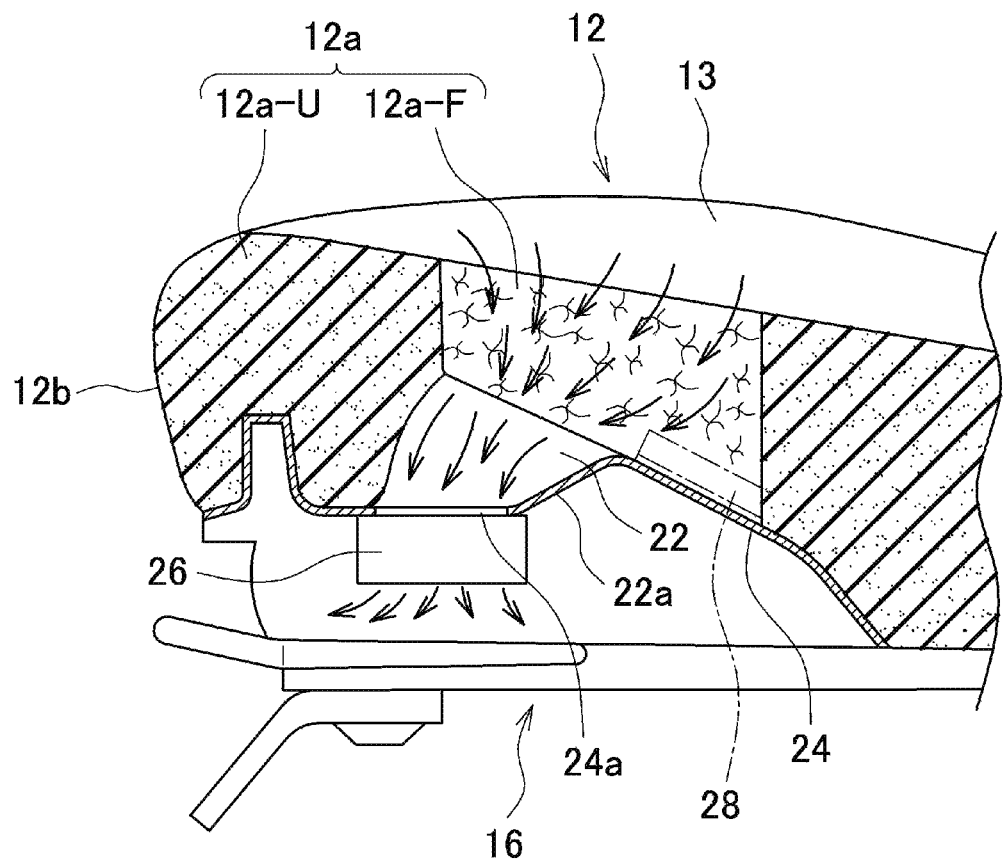
FIG. 2A is a magnified view of the part 1B of the seat shown in FIG. 1A.
Figure 2B:
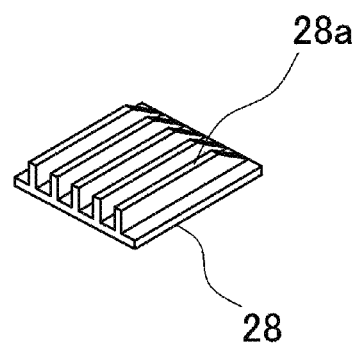
FIG. 2B is a perspective view of the spacer plate laid between the fiber pad and the bottom panel of the seat.

Embodiments of this invention will be described with reference to the accompanying drawings. FIG. 1A is a partly sectional side view of a seat, schematically showing an embodiment of this invention; FIG. 1B is a plan view of the part 1B of the seat shown in FIG. 1A; FIG. 2A is a magnified view of the part 1B of the seat shown in FIG. 1A and FIG. 2B is a perspective view of the spacer plate laid between the fiber pad and the bottom panel of the seat.

As shown in FIG. 1A, the seat 10 includes a seat cushion 12 and a seatback 14 secured to the rear edge of the seat cushion. A headrest 14h is provided at the upper edge of the seatback. Reference number 13 indicates the ridge parts (i.e., bulging parts) provided at the sides of the seat cushion.

The basic structures of the seat cushion 12 and seatback 14 are well known. The seat cushion is formed by mounting a seat pad 12a (cushion member) on a seat frame (not shown), i.e., skeleton, and then covering the seat pad with an air-permeable trim cover 12b (surface sheet). Similarly, the seatback is formed by mounting a seat pad on a frame (not shown) and then covering the seat pad with an air-permeable trim cover 14b. In FIG. 1A, the seat pad of the seatback 14 is not illustrated.

In the embodiment, the seat 10 is embodied as a vehicle seat. The seat can be slid in the front-rear direction by means of a seat sliding device 16.

The seat pad 12a comprises a urethane pad 12a-U and fiber pads 12a-F. The urethane pad is made of foam such urethane foam, and the fiber pad is made of fibers.

The seat cushion 12 has an air conditioning system, which will be described later. The seatback 14 also has an air conditioning system, which is substantially identical in structure with the air conditioning system of the seat cushion 12.

The fiber pads 12a-F are, for example, three-dimensional net bodies, each composed of continuous lines (filament) made of thermoplastic resin and entangled in the form of loops. Each fiber pad is arranged, penetrating a part of the urethane pad 12a-U, from the upper surface of the urethane pad to the lower surface thereof. As shown in FIG. 1B, two fiber pads 12a-F, each having a substantially rectangular cross section, are arranged below those parts of the seat cushion 12, which the occupant's buttocks lie, respectively, when the occupant sits on the seat 10.

It will be described how the seat pad 12a is formed. First, the fiber pads 12a-F are arranged at prescribed positions in a mold for injection molding. Then, the mold is closed, and urethane is poured into the mold and then foamed. At this point, the all sides of each fiber pad 12a-F are impregnated with the urethane. The urethane is then foamed at the all sides of the fiber pad. As a result, the fiber pad 12a-F and the urethane pad 12a-U are molded together, whereby the seat pad 12a is formed.

The fiber pads 12a-F are arranged, each extending in the front-to-rear direction of the seat cushion 12, from the rear end of the first one-fifth part of the seat cushion to the middle part of the seat cushion. The position of the fiber pads is not limited to this, nonetheless.

As shown in FIG. 1B, two fiber pads 12a-F are spaced apart and arranged symmetrically, on the left and the right, respectively. Instead, only one fiber pad may be arranged, for example, in the middle part of the seat cushion 12 as viewed in the left-right direction thereof.

The seat pad 12a is held on a bottom panel 24 attached to the seat cushion frame. As shown in FIG. 2A, the bottom panel 24 covers the lower surface of the urethane pad 12a-U, leaving two spaces below the fiber pads 12a-F, respectively. Thus, non-contact parts (i.e., spaces) exist between the seat pad 12a and the bottom panel 24 and below the fiber pads 12a-F. These spaces function as chambers 22. The upper wall of each chamber 22 is defined by the fiber pad 12a-F, the bottom wall and rear wall 22a thereof are defined by the bottom panel 24, and the left and right walls and front wall thereof are defined by the urethane pads 12a-U.

Two slits 24a are cut in the bottom panel 24 and communicate with the chambers 22, respectively. The bottom panel 24 is, for example, a steel plate or a plastic plate.

Each chamber 22 is so formed that its upper opening, for example, may overlap the fore-left corner or fore-right corner part of the lower surface of the fiber pad. The slits 24a cut in the bottom panel 24 overlap the lower parts of the chamber 22. The positions of the chambers 22 are not limited to this. The chambers 22 may be positioned at the substantially center parts of the fiber pads, respectively.

Each chamber 22 is designed to rectify the airflow. It is shaped like, for example, a funnel, having its cross section gradually narrowing from its upper surface toward its lower surface that has the outlet port. As seen from FIG. 2A, the upper part of the chamber 22 covers only a part of the lower surface of the fiber pad, not covering the entire lower surface of the fiber pad. The back 22a of the chamber is inclined, and the cross-sectional area of the chamber therefore gradually increases from the front to the back. The back 22a of the chamber is inclined upward and backwards by about 30°.

Each chamber 22 has a rectangular cross section, from its upper surface to its lower surface. However, the cross section is not limited to a rectangular one; it may be, for example, circular or elliptical. Further, the cross section of the chamber need not maintain the same shape from the upper part of the chamber to the lower surface thereof. It may be rectangular at the upper surface and circular at the lower surface, or conversely circular at the upper surface and rectangular at the lower surface.

An air intake means 26 is arranged below the bottom panel 24, more precisely below the slit 24a. In the embodiment, the air intake means is secured to the lower surface of the bottom panel 24. The air intake means 26 is a blowing means, the fan of which is rotated in reverse direction.

The upper part of the chamber 22 faces the fiber pad 12a-F. The lower part of the chamber 22 is surrounded by the bottom panel 24 and faces the inlet port (not shown) of the air intake means 26 through the slit 24a of the bottom panel.

How air flows in the air conditioning system will be described below in detail.

When the air intake means 26 is driven, the air is drawn from the upper surface of the fiber pad through the trim cover 12b and flows into each fiber pad 12a-F. The air is diffused in the fiber pad, and flows from the lower surface of the fiber pad into the chamber 22. Then, the air flows in the chamber, flows out of the chamber through the slits 24a of the bottom panel, and is released from the air intake means 26.

Since the chamber 22 is shaped like a funnel, having its cross section gradually narrowing from its upper surface toward its lower surface, the air coming from the fiber pad 12a-F into the chamber 22 flows in the chamber and rectified as shown in FIG. 2A. The air so rectified in the chamber promotes the rectification of the air flowing into the chamber. The air is rectified and flows in the fiber pad, too.

Thus, the air flows into the chamber from the fiber pad, not only from that part of the fiber pad 12a-F, which lies above the chamber 22, but also from the region surrounding said part. The airflow is therefore generated also in that part of the fiber pad, which is remote from the chamber. Hence, the air flows well in the fiber pad, while being diffused therein. Since the air so flows well in the fiber pad, it is drawn not only from above the fiber pad, but also around the fiber pad. The air therefore flows into the fiber pad, together with the heat or moisture accumulated in the space between the occupant's buttocks and the seat cushion. As a result, the heat or moisture is adequately removed from the space between the occupant's buttocks and the seat cushion.

Moreover, the heat or moisture accumulated in the fiber pad can be adequately removed because the air thoroughly flows and is diffused in the fiber pad.

That is, not only the heat or moisture accumulated between the occupant's buttocks and the seat cushion, but also the heat or moisture accumulated in the fiber pad can be fully removed as the air flows after it has been drawn from the upper surface of the fiber pad. The occupant can therefore be relieved from heat or moisture, and does not feel uncomfortable.

In the embodiment, the upper part of the chamber 22 does not cover the entire lower surface of the fiber pad, overlapping only a part of the fiber pad. The chamber 22 has its back 22a inclined, however, and has its cross-sectional area increasing toward the uncovered part of the fiber pad. So shaped, the chamber 22 promotes the rectification of the air. Therefore, the air flows into the chamber, also from that part of the fiber pad, which is not covered with the chamber 22. Heat or moisture can therefore be adequately removed also from that part of the fiber pad, which is not covered with the chamber 22, even if the air intake means 26 does not have a large output. Since the air intake means 26 needs to have, but a small output, the air conditioning system can be small and light and can be available at low price. Further, owing to its small output, the air intake means 26 consumes a little electrical power, makes small vibration and small noise, and hence consumes little fuel, little affecting the environment.

Of course, the chamber 22 may be shaped, if necessary, so that its upper part of the chamber 22 may cover the entire lower surface of the fiber pad.

Grooves communicating with the chamber 22 and extending in the front-rear direction may be cut in that part of the lower surface of the fiber pad, which does not cover the upper part of the chamber 22 and contacts the bottom panel 24. This will promote the airflow to the chamber from that part of the fiber pad, which does not cover the upper part of the chamber 22.

FIG. 2B is a perspective view of the spacer plate laid between the fiber pad and the bottom panel of the seat. The spacer plate 28 is, for example, a plastic plate, and has a plurality of projections 28a. The projections 28a are arranged at regular intervals. The spacer plate 28 may be provided between the fiber pad 12a-F and the bottom panel 24, with the projections 28a positioned in the lengthwise direction. In this case, the grooves extending in the front-rear direction and communicating with the chamber 22 are set parallel on the bottom panel and below the fiber pad. The air therefore flows from the lower surface of the fiber pad into the chamber through the grooves extending in the front-rear direction. Heat or moisture can therefore be removed also from that part of the fiber pad, which the chamber does not cover, though the air intake means 26 does not have a large output.

The spacer plate 28 is nothing more than an example. The means for providing grooves extending in the front-rear direction and communicating with the chamber 22 is not limited to the spacer plate 28. Instead, plastic projections partly spherical, for example, may be adhered to the bottom panel, defining grooves extending in the front-rear direction.

As shown in FIG. 1B, two fiber pads 12*a*-F are arranged symmetric in the left-right direction. Below the right fiber pad 12*a*-F1, a chamber 22-1 is defined. Below the left fiber pad 12*a*-F2, a chamber 22-2 is defined. Two air intake means 26-1 and 26-2 are independently arranged, below the chambers 22-1 and 22-2 to draw and release air from the chambers, respectively.

Figure 3A:
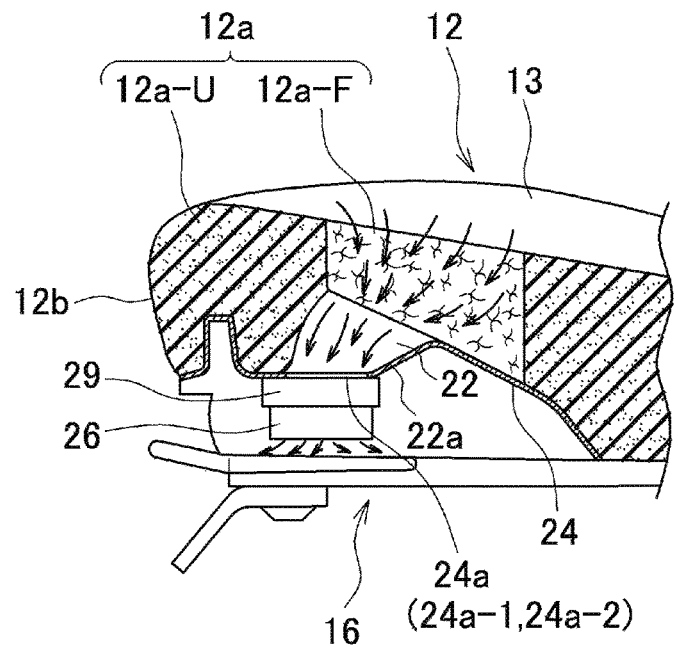
FIG. 3A is a partly sectional side view corresponding to FIG. 1A, showing an embodiment of a modification of the invention.
Figure 3B:
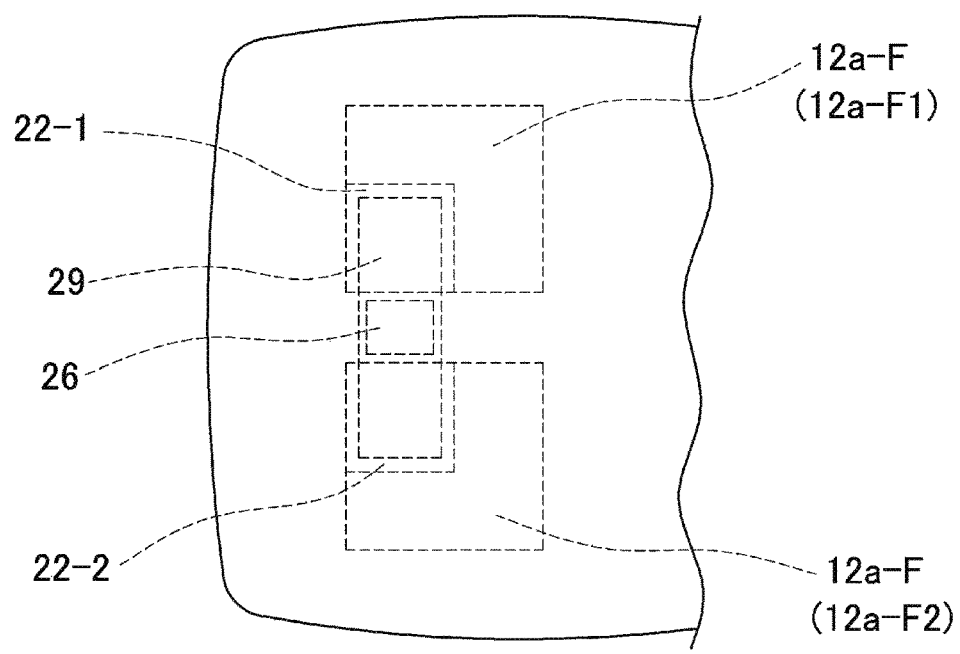
FIG. 3B is a partly sectional plan view corresponding to FIG. 1B, showing the embodiment of modification of the invention.
Figure 4:
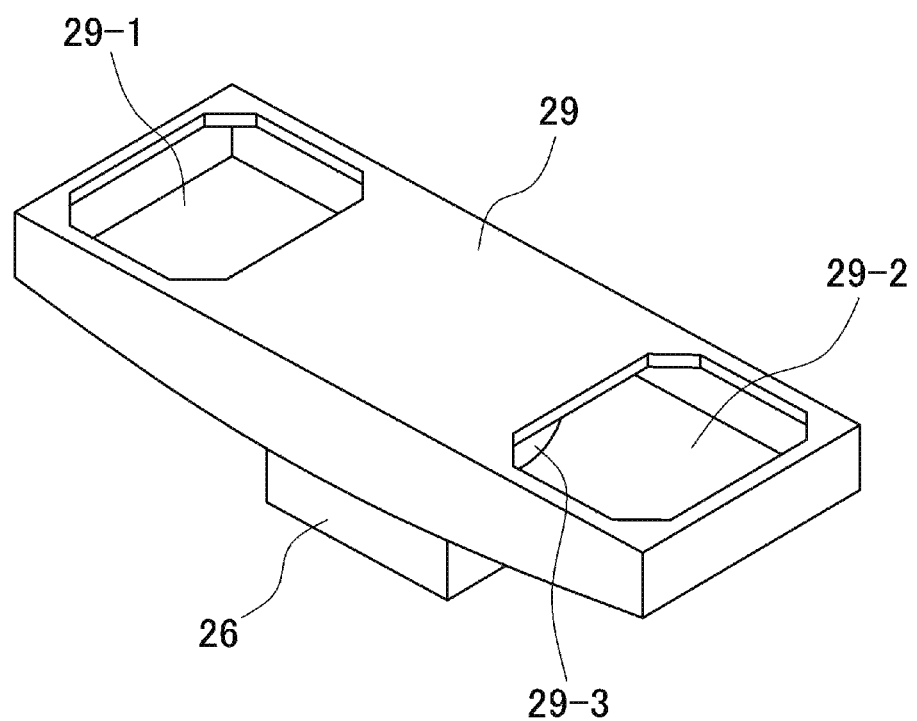
FIG. 4 is a perspective view of a duct.

Only one air intake means may be used, instead. FIG. 3A and FIG. 3B are a partly sectional side view and a partly sectional plan view corresponding to FIG. 1A and FIG. 1B, respectively, and show an embodiment of a modification of the invention. FIG. 4 is a perspective view of a duct.

In the modification of the invention, the bottom panel 24 has holes 24*a*-1 and 24*a*-2, which are located below the chambers 22-1 and 22-2, respectively. A duct (communicating member) 29 is secured to the lower surface of the bottom panel, covering the two holes from below, and communicates with the two chambers.

As shown in FIG. 4, the duct 29 is shaped like a box having, for example, two inlet ports 29-1 and 29-2 and one outlet port 29-3. The inlet ports are made in the left and right parts of its upper surface and communicate with the chambers 22-1 and 22-1, respectively. To the lower surface of the duct, one air intake means 26 is secured, covering the outlet port 29-3.

The duct 29 makes the chambers 22-1 and 22-2 communicate with each other, and the air intake means 26 is secured to the lower surface of the duct, covering the outlet port 29-3. Therefore, when the air intake means 26 is driven, the air flows from the chambers 22-2 and 22-2 into the duct 29 through the inlet ports 29-1 and 29-2. The air is then drawn through the outlet port 29-3 into the air intake means 26. Thus, one air intake means works for two air streams.

In the embodiment, the bottom panel 24 covers the lower surface of the urethane pad 12*a*-U, leaving a space, i.e., chamber 22, below the fiber pad 12*a*-F. The method of defining the chamber 22 is not limited to this, nevertheless. Instead of using the bottom panel 24, the chamber may be constituted by a different member.

For example, a hollow box-shaped member (different member) which defines a chamber and has, in the lower surface, an opening facing the air intake means may be secured to the lower surface of the urethane pad 12*a*-U, with its upper surface facing the fiber pad. The box-shaped member is constituted by, for example, metal plates or plastic plates, opens at the top, and has an outer flange at the upper edges. Utilizing the outer flange, the box-shaped member is secured to the lower surface of the urethane pad 12*a*-U.

The box-shaped member defining the chamber functions as duct 29. That is, the box-shaped member has, in the upper surface, two openings above the two fiber pads, respectively, and in the lower surface, one opening facing the air intake means. The box-shaped member therefore functions as the above-mentioned duct 29 (communicating with the two fiber pads). Thus, the duct for connecting the two chambers need not be used, reducing the number of components.

The embodiment described above is an air conditioning system for use in the seat cushion 12. An air conditioning system for use in the seatback 14 can be easily provided, merely by replacing the up-down position of the seat cushion with the front-rear position of the seatback 14.

FIG. 4A-A is a partly sectional side view of a seat cushion and seatback, schematically showing an embodiment of this invention; and FIG. 4A-B is a plan view of the part 4A-B of the seatback shown in FIG. 4A-A.

More precisely, in the air conditioning system of the seatback 14, each fiber pad 112*a*-F (112*a*-F1, 112*a*-F2) penetrates a part of the urethane pad 112*a*-U in the front-rear direction. Further, each chamber 122 (122-1, 122-2) shaped like a funnel, having its cross section gradually narrowing from its front surface toward its rear surface, is provided at the back of the fiber pad 112*a*-F, and a rear panel 124 (corresponding to the bottom panel) is provided at the rear surface (back) of the urethane pad 112*a*-U. The rear panel 124 has a slit 124*a* that faces the rear part of the chamber 122. At the back of the slit 124*a*, the air intake means 126 (126-1, 126-2) is secured to, for example, the rear surface of the rear panel 124, facing the rear part of the chamber 122. It should be noted that the rear-surface part of the seatback 14 has a space for accommodating an air intake means 126. Reference number 113 indicates the ridge parts (i.e., bulging parts) provided at the sides of the seatback. Reference numbers 122*a* and 124' indicate a back board of the seatback.

As in the air conditioning system of the seat cushion, air is drawn into and flows in the fiber pads in the air conditioning system of the seatback, achieving similar advantages.

That is, as the air intake means 126 is driven, the air is drawn from the front surface of each fiber pad 112*a*-F through the trim cover and then flows, while being diffused, in each fiber pad 112*a*-F. Then, the air flows from the rear surface of each fiber pad 112*a*-F into the chamber 122, flows in the chamber and flows out through the slit 124*a* made in the rear panel. In each chamber 122, the airflow coming from the fiber pad 112*a*-F is rectified. In each fiber pad 112*a*-F, too, the air flows in the rectified state. Therefore, the air drawn from the front surfaces of the fiber pads 112*a*-F can adequately remove the heat or moisture not only from the space between the seatback 14 and the occupant's back, but also from the fiber pads 112*a*-F provided in the seatback.

The air intake means 26 draws air through the trim cover from the upper surface of the fiber pads provided in the seat cushion (and from the front surfaces of the fiber pads provided in the seatback). Instead, a blowing means may be used to supply air into the chambers and to make the air flow out from the fiber pad 12*a*-F.

The air conditioning system of the seat cushion will be described further. A blowing means, such as a fan or a blower, is provided in each chamber, on the side opposite to the fiber pad. In the facing the chamber, the air supplied from the blowing means is rectified. The air rectified flows into each fiber pad and is diffused, and flows thoroughly in the fiber pad. Therefore, the air flows not only from the region above the fiber pad, but also from the region surrounding the fiber pad. The heat or moisture accumulated in the space between the occupant's buttocks and the seat cushion can therefore be adequately removed.

Moreover, the heat or moisture accumulated in each fiber pad can be adequately removed, because air is diffused in the fiber pad, and thoroughly flows therein.

As described above, the air is rectified in the fiber pads, and flows thoroughly therein. Therefore, the air is drawn not only from the region above the fiber pad, but also from the region surrounding the fiber pad. Hence, the air flows into the fiber pads, together with the heat or moisture accumulated in the space between the occupant's buttocks and the seat cushion or the space between the occupant's back and the seatback. As a result, the heat or moisture can be adequately removed from the vehicle seat.

The embodiment described is one for explaining this invention, and is not intended to limit the invention at all. Needless to say, any change and any modification made within the technical scope of the invention are included in the present invention.

For example, the air conditioning system of the seat, which is usually provided in both the seat cushion and the seatback, may be provided in either the seat cushion or the seatback in the present invention.

INDUSTRIAL APPLICABILITY

This invention is applied to the vehicle seat for use in buses, cars and aircraft. Its use is not limited to the vehicle seat, however. The invention can be applied also to a seat for long-time use, having a fiber pad constituting a part of its seat pad, such as a seat for use in offices, public halls, theaters, movie houses, sport facility.

REFERENCE MARKS IN THE DRAWINGS

10 vehicle seat (air-permeable seat)
12 seat cushion
12*a* seat pad
12*a*-U, 112*a*-U urethane pad
12*a*-F, 112*a*-F fiber pad(s)
12*b* trim cover
22, 122 chamber
24, 124 bottom panel, rear panel
24*a* slit(s)
26 air intake means
28 spacer plate
28*a* projections
29 duct (communicating member)

What is claimed is:

1. An air-permeable seat having a seat cushion and a seatback, each formed by mounting a urethane pad on a frame used as skeleton and then covering the urethane pad with an air-permeable trim cover, the air-permeable seat comprising:
    a fiber pad provided in at least one of the seat cushion and the seatback and penetrating a part of the urethane pad from an upper surface to a lower surface of the urethane pad;
    a chamber shaped to rectify an airflow coming from the fiber pad; and
    a fan configured to draw air from a surface of the fiber pad through the trim cover, flow the air in the fiber pad, and introduce the air from the fiber pad into the chamber;
    wherein the chamber is defined at the back of the fiber pad and abuts the fiber pad, and a cross section of the chamber has a shape that gradually narrows from an air inlet side to an air outlet side, and
    wherein the fan faces the chamber and is configured to make the air rectified in the chamber flow out through the chamber, whereby the rectified air flows in the fiber pad.

2. The air-permeable seat according to claim 1, wherein:
    the fiber pad penetrates a part of the urethane pad of the seat cushion, from the upper surface to the lower surface of the urethane pad;
    a bottom panel is provided, covering the lower surface of the urethane pad and providing a space defining the chamber below the fiber pad, and a slit is cut in the bottom panel and faces a lower part of the chamber;
    the fan is secured to a lower surface of the bottom panel and faces the chamber through the slit; and
    the air rectified in the chamber flows out through the slit cut in the bottom panel.

3. The air-permeable seat according to claim 2, wherein the chamber is shaped like a funnel.

4. The air-permeable seat according to claim 1, wherein:
    the fiber pad penetrates a part of the urethane pad of the seat cushion, from the upper surface to the lower surface of the urethane pad;
    a hollow box-shaped member is secured to the lower surface of the urethane pad, the hollow box-shaped member having an upper surface facing the urethane pad, a lower surface having an opening facing the fan, and a space communicating with the chamber;
    the fan is secured to the lower surface of the box-shaped member and faces the chamber through the opening made in the lower surface of the box-shaped member; and
    the air is rectified in the chamber and flows out through the opening of the lower surface of the box-shaped member.

5. The air-permeable seat according to claim 4, wherein the chamber is shaped like a funnel.

6. The air-permeable seat according to claim 1, wherein:
    the fiber pad is provided in a part of the urethane pad of the seatback and penetrates the urethane pad from a front surface to a rear surface of the urethane pad;
    a rear panel covers the rear surface of the urethane pad, leaving a space defining the chamber, and has a slit facing a rear part of the chamber;
    the fan is secured to the rear surface of the rear panel; and
    the air is rectified in the chamber and flows out through the slit of the rear panel.

7. The air-permeable seat according to claim 6, wherein the chamber is shaped like a funnel.

8. The air-permeable seat according to claim 1, wherein:
    the fiber pad is provided in a part of the urethane pad of the seatback and penetrates the urethane pad from a front to a back of the urethane pad;
    a hollow box-shaped member is secured to the rear surface of the urethane pad, the hollow box-shaped member having a front surface facing the fiber pad, a rear surface having an opening facing the fan, and a space communicating with the chamber;
    the fan is secured to the rear surface of the box-shaped member and faces the chamber through the opening made in the rear surface of the box-shaped member; and
    the air is rectified in the chamber and flows out through the opening of the rear surface of the box-shaped member.

9. The air-permeable seat according to claim 8, wherein the chamber is shaped like a funnel.

10. The air-permeable seat according to claim 1, wherein the chamber is shaped like a funnel.

11. An air conditioning system for a seat comprising a seat cushion and a seatback, each formed by mounting a urethane pad on a frame used as skeleton and then covering the urethane pad with an air-permeable trim cover, the system causing air to flow in the urethane pad of the seat cushion and the seatback, and the system comprising:

a fiber pad penetrating a part of the urethane pad from an upper surface to a lower surface of the urethane pad;

a chamber shaped to rectify an airflow coming from the fiber pad; and a fan configured to draw air from the surface of the fiber pad through the trim cover, flow the air in the fiber pad, and introduce the air from the fiber pad into the chamber, wherein the chamber is defined at the back of the fiber pad and abuts the fiber pad, and a cross section of the chamber has a shape that gradually narrows from an air inlet side to an air outlet side, and wherein the fan faces the chamber and is configured to make the air rectified in the chamber flow out through the chamber, whereby the rectified air flows in the fiber pad.

12. The air conditioning system according to claim 11, wherein:

the fiber pad penetrates a part of the urethane pad of the seat cushion, from the upper surface to the lower surface of the urethane pad;

the chamber is defined below the fiber pad, abutting the fiber pad; and the air rectified in the chamber flows out through the chamber.

13. The air conditioning system according to claim 11, wherein:

the fiber pad penetrates a part of the urethane pad of the seatback, from a front surface to a rear surface of the urethane pad; and the chamber is defined at the back of the fiber pad, abutting the fiber pad; and the air rectified and flowing in the chamber flows out through the chamber.

* * * * *